United States Patent
Gökçen

(12) 
(10) Patent No.: US 6,656,594 B1
(45) Date of Patent: Dec. 2, 2003

(54) METHOD TO PRODUCE SHAPED MULTI-LAYER PLATES, THE RELATIVE PLANT AND SHAPED MULTI-LAYER PLATES OBTAINED THEREWITH

(75) Inventor: Mehmet Celāl Gökçen, Bursa (TR)

(73) Assignee: B. Plas Bursa Plastik Sanayi, Ve Ticaret A.S. Demitras Organize San., Bursa (TK)

( * ) Notice: Subject to any disclaimer, the term of this patent is extended or adjusted under 35 U.S.C. 154(b) by 0 days.

(21) Appl. No.: 09/355,106

(22) PCT Filed: Jan. 15, 1998

(86) PCT No.: PCT/IB98/00059

§ 371 (c)(1),
(2), (4) Date: Jul. 23, 1999

(87) PCT Pub. No.: WO98/32607

PCT Pub. Date: Jul. 30, 1998

(30) Foreign Application Priority Data

Jan. 23, 1997 (IT) ......................................... UD97A0010

(51) Int. Cl.$^7$ ............................................... B32B 27/36
(52) U.S. Cl. ..................... 428/412; 428/415; 428/423.7; 428/424.4; 428/448; 428/495; 264/176.1; 264/138; 264/145; 264/148; 264/163
(58) Field of Search ................................. 428/215, 412, 428/424.4, 424.8, 423.7, 448, 483, 495; 264/142, 138, 145, 148, 163, 211.2, 405, 176.1

(56) References Cited

U.S. PATENT DOCUMENTS 3,024,496 A * 3/1962 Colombo ........................ 18/19
4,868,058 A   9/1989 Biglione

FOREIGN PATENT DOCUMENTS

| EP | 593236   | * | 4/1994 |
| GB | 891829   | * | 3/1962 |
| GB | 2092055  | * | 8/1982 |
| GB | 218252   | * | 4/1987 |

* cited by examiner

Primary Examiner—Merrick Dixon
(74) Attorney, Agent, or Firm—Antonelli, Terry, Stout & Kraus, LLP

(57) ABSTRACT

A method to produce shaped multi-layer plates having super-imposed layers includes individually extruding raw materials comprising powder, granules, or crystals, in liquid form, to form a plurality of separate layers, each layer being mono-component or multi-component, superimposing the separate layers, co-extruding the superimposed layers through a co-extrusion head with plane lips to form a continuous flat multi-layer plate with a plane surface, subjecting the flat multi-layer plate emerging from the co-extrusion head to a calendering pass to provide thermal, chemical and dimensional stabilization, subjecting the flat continuous multi-layer plate emerging from the calendering pass to a pass of thermal adjustment and shaping, and cooling and shearing to size the shaped multi-layer plate emerging from the pass of thermal adjustment and shaping so as to obtain shaped multi-layer plate of the desired length.

33 Claims, 4 Drawing Sheets

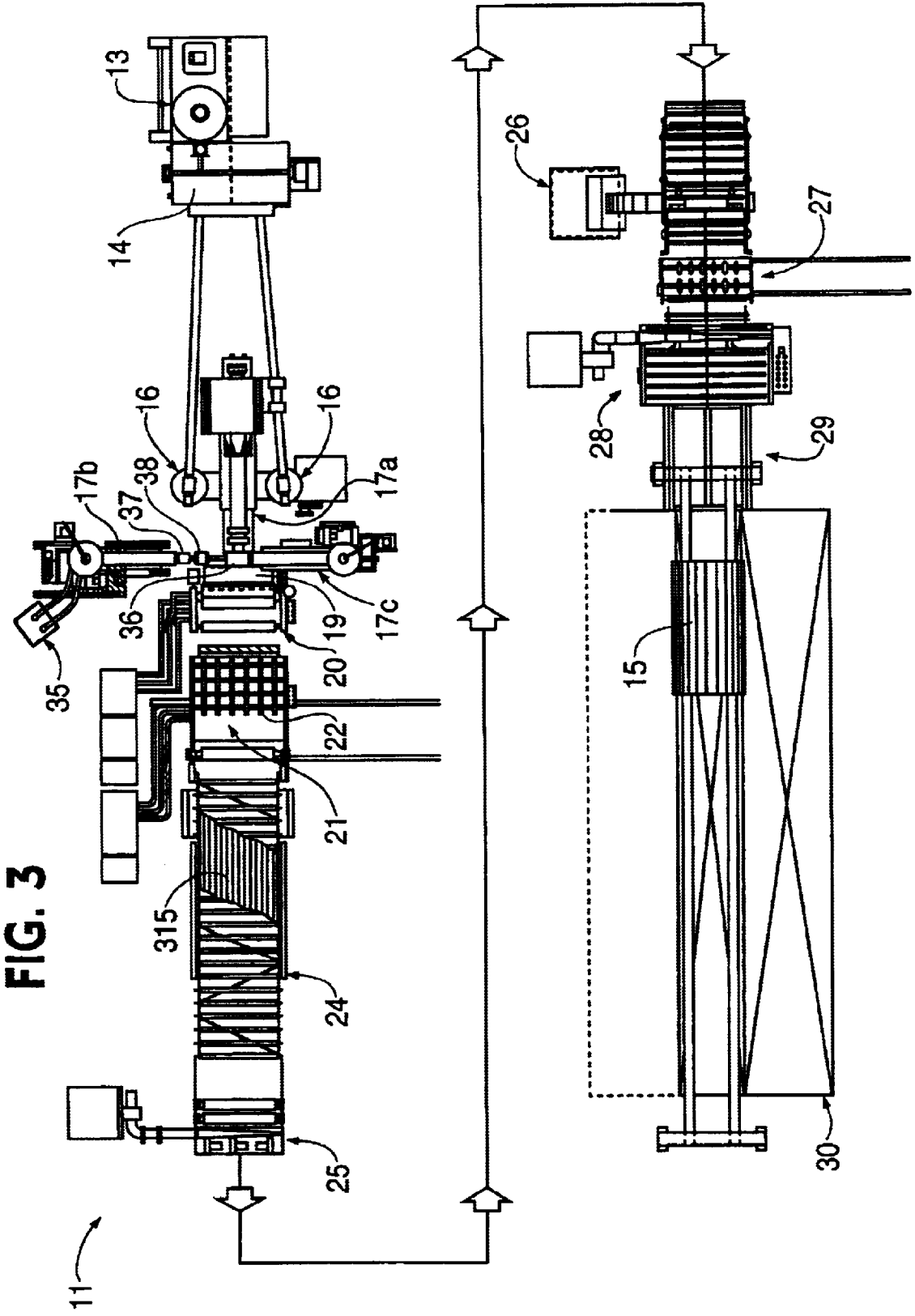

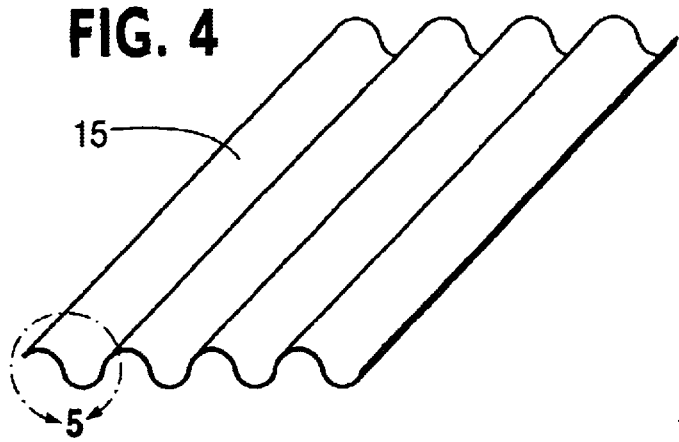
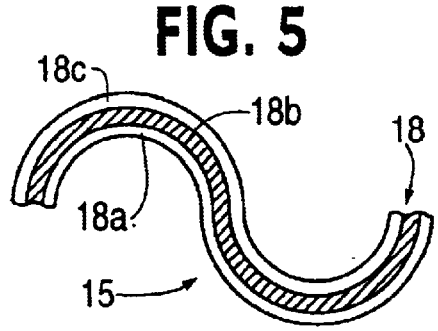
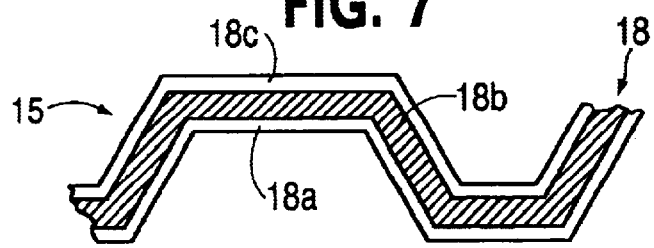
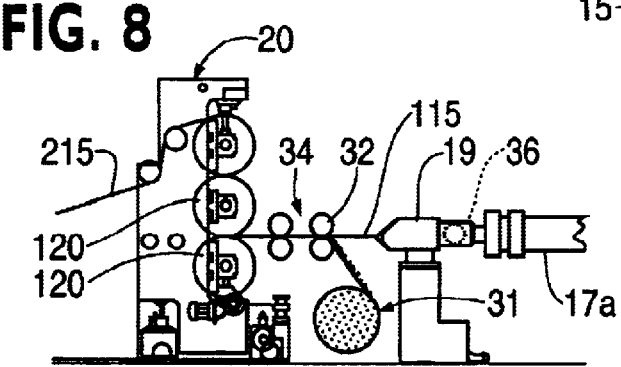
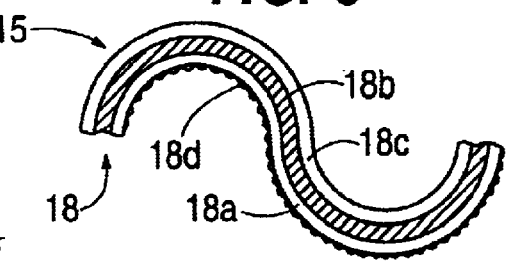
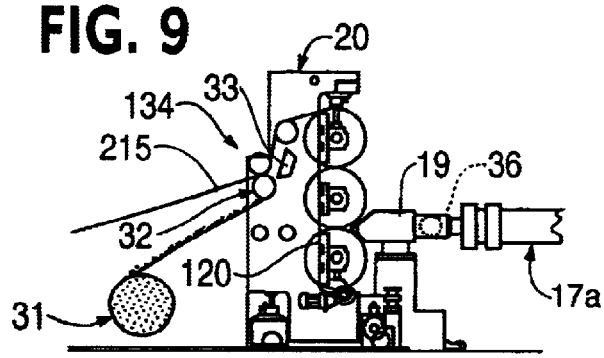

METHOD TO PRODUCE SHAPED MULTI-LAYER PLATES, THE RELATIVE PLANT AND SHAPED MULTI-LAYER PLATES OBTAINED THEREWITH

FIELD OF APPLICATION

This invention concerns a method to produce shaped multi-layer plates, the relative plant for their production and also the shaped multi-layer plates obtained thereby, as set forth in the respective main claims.

The invention is applied in the production of shaped multi-layer plates employed in the field of building construction, principally as modular elements to provide a mantle or covering.

The multi-layer plates can also be applied in other fields, such as for example furnishings or accessories.

STATE OF THE ART

The state of the art covers modular plates used to cover large areas such as, for example, warehouse roofs, industrial buildings, schools, etc.

Compared with traditional coverings such as tiles, flat tiles, etc., these modular plates are less expensive, quicker to install, have better mechanical characteristics, such as weight, good resistance to shocks, and to atmospheric agents, etc. Moreover, the plates make it possible to achieve extremely complex shapes and to cover extremely sharp inclines.

At the present time, these modular plates are made of metal, for example, copper, zinc-plated or stainless steel, aluminium etc., or by using other materials such as synthetic resins, or also fibre cement or asbestos cement.

Plates made of synthetic resins are lighter and more resistant to corrosion, are less heat conductive, easier to work and offer a greater variety in terms of appearance and finishing.

Plates made of fibre cement, or asbestos cement, which are sold under the names of Eternit®, Amiantit®, Solonit®, Fibronit® etc., have the disadvantage that with time they lose their original compactness and release into the environment the mineral fibres which they contain.

The prolonged action of atmospheric agents, differences in temperature, erosion caused by the wind, acid rain and the proliferation of vegetal microorganisms, cause in the long term a deterioration of the plates.

At the present time, there is the appropriate legislation which imposes the disposal of coverings made in asbestos cement in order to eliminate the spread into the environment of asbestos fibres and dust, which are particularly harmful to man.

Of the various disposal techniques, there is one known to the state of the art whereby covering plates made of synthetic thermoplastic resins are applied on top of the fibre cement or asbestos plates. These resins normally include reinforced polyesters, polyvinyl chloride (PVC) polymethylmethacrylate (PMMA) or other similar compounds.

Apart from eliminating pre-existing roof coverings, these synthetic resin plates are also used as primary building elements to make new coverings.

The plates are usually produced by a process of extrusion, using a single type of material, or by means of co-extrusion using materials with different bases so as to achieve a multi-layer.

In this last case, the state of the art includes, for example, plates or panels including at least an inner layer which has a supporting and stiffening function, whereas the outer layers have a covering function, thus providing an aesthetic appearance and high resistance to atmospheric agents.

In order to make them more rigid, and to form obligatory routes which will deliver the rain water to the gutter, the multi-layer plates are shaped with a form like a wave, or fretted or otherwise.

In production methods known to the state of the art, the plates are shaped directly during the step of extrusion, or of co-extrusion, by an extrusion head with lips which have an outlet in the shape desired for the plate.

According to another technique, the plates are shaped downstream of the extrusion machine, by sizing-shaping rollers placed immediately at the outlet of the extrusion head.

In both cases, the plates are shaped when the plastified material is not yet stabilized thermally, dimensionally and chemically.

This means that the overall thickness and/or the thickness of the individual plates, is not uniform over all the surface of the multi-layer plates; it therefore follows that in some areas the plate does not have the required characteristics, and is therefore more fragile and vulnerable to the atmospheric agents. Moreover, as the shaping is carried out when the plastifed material is not yet perfectly stabilized, the layers slip against each other and cause surface tensions which cause plates to be created with irregular and discontinuous surfaces.

In some segments, especially if the outer layers are of a limited thickness, fissures, cracks or microcraters are generated. These make the inner layers too close to the surface, and these are often not suitable to be exposed to the atmospheric agents. The plates themselves are also structurally weakened.

To overcome this disadvantage, it is often necessary to oversize the thickness of the individual layers, but this causes an increase in the costs of production, the weight of the plate, in adaptability and other problems.

Another shortcoming is the early wear caused by thermal stress to which the sizing-shaping rollers are subject, because of their position at the outlet of the extruder head. This early wear affects the shaped plate and causes a dimpling effect on the surface layers and thus the inner layers are revealed.

In some applications, for example in roof coverings on buildings for the food or textile industry, the layer facing the inside of the building is covered with a layer of non-fabric fabric, or other similar or comparable material, in order to prevent drops of condensation from forming which could contaminate the products made in such buildings.

At the present time, the layer of non-fabric fabric is associated with the covering plates by gluing; in the long term, this involves poor adhesion and consequently the layer of non-fabric fabric comes unstuck from the covering plate.

Moreover, the non-fabric fabric plate is attached when the multi-layer plate is already stabilized, and at a different step of the production procedure; this causes an increase both in production costs and in production times.

EP-A-0218252 describes a method to obtain multilayer slabs using three extruders coming together at a coextrusion head, from which the multilayer composite is recovered, which is cooled by the rollers of a calender and is drawn by means of a train.

This document does not teach or suggest a method to produce shaped or corrugated plates able to solve the aforementioned problems.

The present applicants have designed, tested and embodied this invention to overcome the shortcomings of the state of the art, and to achieve further advantages.

DISCLOSURE OF THE INVENTION

The purpose of the invention is to provide a method to produce shaped multi-layer plates whether they be flat, undulate or of, any desired shape, able to supply products of a high quality and in limited production times.

Yet another purpose of the invention is to produce shaped multi-layer plates of superior mechanical characteristics and high quality, such as: high structural and surface resistance to stress and destructive agents, lightness, brightness, uniform thickness of all the layers, cohesion between the layers, no cracks, micro-fissures, micro-craters, surface tension.

In the shaped plates according to the invention, the inner layers do not show through, the outer surfaces do not crumble and no powder particles or similar are released into the atmosphere.

Each layer can be of the mono-component or multi-component type.

At least in the case of a multi-component layer, each layer can be obtained by means of extrusion, using a two-stage coextruder, whereby it is possible to eliminate a plurality of operations normally performed before extrusion, such as drying or de-gassing.

The layers are put together by a feeder assembly and then subjected to heating and plastification in an extrusion assembly with a co-extruder head with flat lips.

A continuous and flat-surfaced multi-layer emerges from the co-extrusion head, and is then fed to a calendering assembly which includes at least a pair of stabilizing cylinders.

The flat multi-layer plate emerging from the calendering assembly has a uniform thickness, due to the effect of the stabilizing cylinders. The layers are stabilized and in perfect cohesion, they have a good aesthetic appearance, the right temperature, and the desired consistence and rigidity.

Moreover, thanks to the planarity of the plate, no wrinkle effect is created between the layers and therefore no micro-fissures are created in the outer layers.

According to the invention the flat multi-layer plate emerging from the calendering assembly is fed to an assembly comprising a plurality of shaping rollers, where the plate is thermally adjusted and shaped.

The thermal adjustment and shaping assembly heats the multi-layer plate to and/or maintains it at the appropriate temperature for plastic deformation, and also impresses the desired shape to the plate.

According to the invention, the plate may be shaped lengthwise and/or widthwise, and may have a wave-shaped profile, a fretted profile, a mixed profile or another desired profile.

The shaped multi-layer plate, when it leaves the thermal adjustment and shaping assembly, is cooled, optionally trimmed at the edges and then fed to an assembly for shearing to size.

The multi-layer plates, after shearing to size are then discharged arid accumulated automatically on the appropriate storage surfaces such as, for example, pallets.

According to a variant, upstream of the thermal adjustment and shaping assembly there is an application assembly which associates with the multi-layer plate, by a simple operation of heat cohesion, a supplementary layer of material for protection, finishing, adornment or other, such as for example, non-woven fabric or imitation leather.

According to a first embodiment, the supplementary layer is associated with the flat plate in an intermediate position between the extrusion assembly and the calendering assembly.

According to another embodiment, the supplementary layer is associated with the flat plate in an intermediate position between the calendering assembly and the thermal adjustment and shaping assembly.

According to the invention, the application assembly of the supplementary layer comprises at least a directly heated cylinder and/or a cylinder cooperating with external heating means suitable to raise the temperature of the multi-layer plate to one suitable to apply the protective and/or adornment layer, without the need for additives.

According to the invention, the multi-layer plate includes at least two layers.

In the preferred embodiment of the invention there are at least three layers: one intermediate structural layer and two outer layers, respectively upper and lower.

The intermediate structural layer has the function to guarantee high resistance both mechanical and chemical; according to a variant the intermediate layer is loaded with filling and/or reinforcing materials.

The outer layers have the function to guarantee high resistance to mechanical stresses and, in particular the upper layer has the function to guarantee high resistance to ageing and to deteriorating agents; the upper layer must also have high brightness and shine.

According to the invention, the outer layers are less thick than the intermediate layer.

According to a first embodiment of the invention, the lower layer is made of anti-shock polyvinyl chloride (PVC), for its characteristic of superficial smoothness and pleasant aesthetic appearance.

According to a variant, the lower surface is made of polycarbonate (PC), or high density polyethylene (PEHD), or propylene (PP).

According to one embodiment of the invention, the intermediate layer is made of polyvinyl chloride (PVC), optionally with the addition of semi-expanded material or loaded with filling and/or strengthening materials.

According to a variant, the intermediate layer is made of high density polyethylene (PHD) or polypropylene (PP).

According to another variant, the intermediate layer is made of several differentiated layers, each characterised by a different load or materials.

For strengthening, filling and/or lightening materials for use in the intermediate layer, it is possible to use calcium carbonate ($CaCO_3$), powdered cork, wood chips, granulated cereals, mineral or glass fibres.

According to one embodiment of the invention, the upper layer is made of polymethyl methacrylate (PMMA); this material, apart from being highly resistant, gives a good aesthetic quality because it has a shiny surface and also can be coloured any shade desired, either transparent or opaque (smoked).

According to a variant, the upper layer is made of polycarbonate (PC), or anti-shock polyvinyl chloride (PVC), or in polypropylene (PP) or yet again in acrylonitrile-butadiene-styrene (ABS).

ILLUSTRATION OF THE DRAWINGS

The attached drawings are given as a non-restrictive example, and show some preferred embodiments of the invention as follows:

FIG. 1 shows a block diagram of the method according to the invention;

FIG. 2 shows a side view of a plant producing shaped multi-layer plates, according to the method as shown in FIG. 1;

FIG. 3 shows a plane view of the plant as in FIG. 2;

FIG. 4 shows an embodiment of a shaped multi-layer plate according to the invention, FIG. 5 shows the enlarged detail A of FIG. 4;

FIG. 6 shows a variant of FIG. 5;

FIG. 7 shows another variant of FIG. 5;

FIG. 8 is a part view of a variant of FIG. 2; and

FIG. 9 is a part view of another variant of FIG. 2.

DESCRIPTION OF THE DRAWINGS

In the method 10 according to the invention, shown in a block diagram in FIG. 1 and realized in the plant 11 as shown in FIGS. 2 and 3, the raw materials 12a, for example in granules, crystals, powder or liquid form, together with any special products or additives, which go to make up the Intermediate layer 18b of the shaped multi-layer plate 15, are first mixed and homogenized in a mixing device 13.

In this case, the mixing device 13 consists of a turbomixer.

Figure 1:
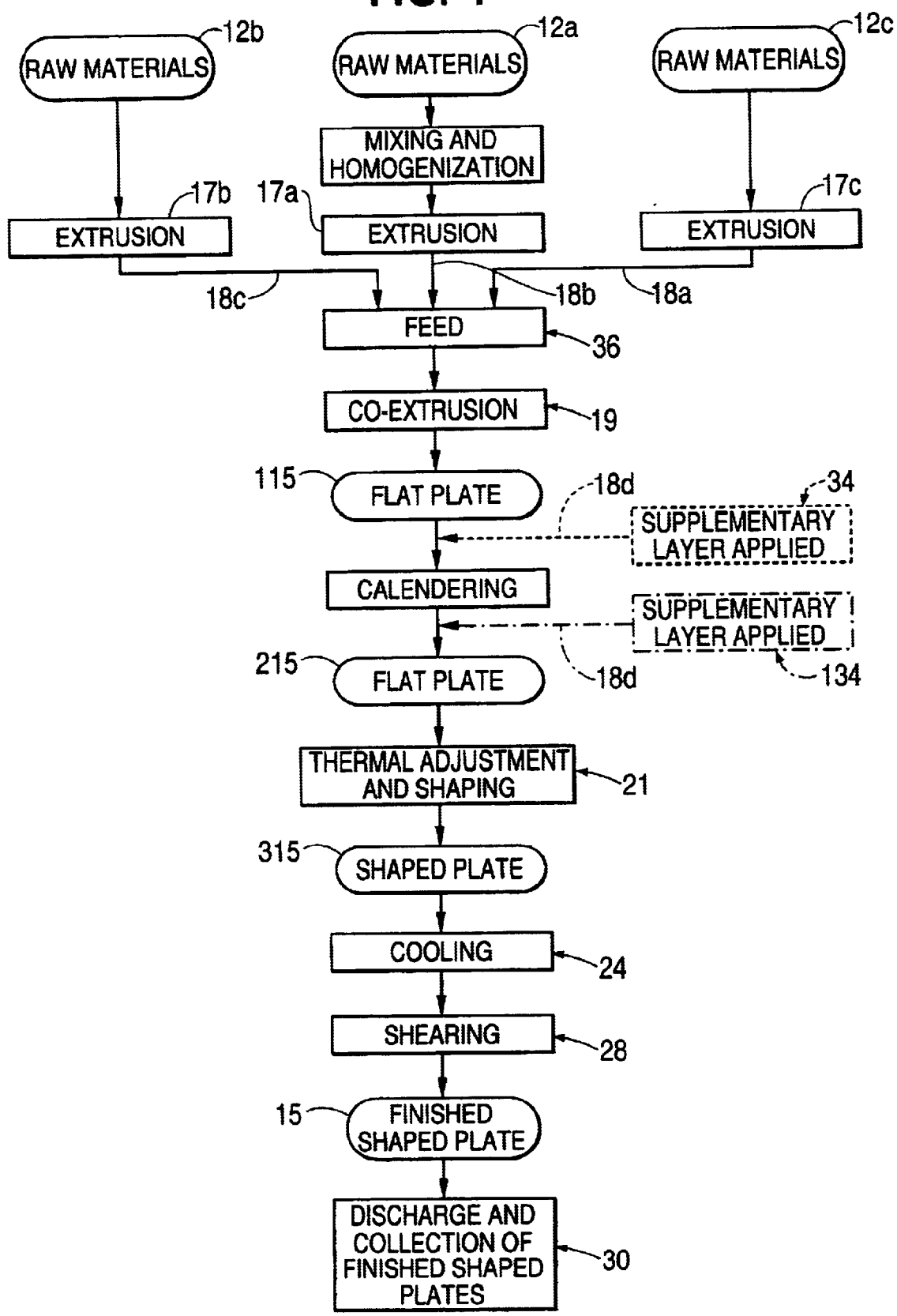
Figure 2:
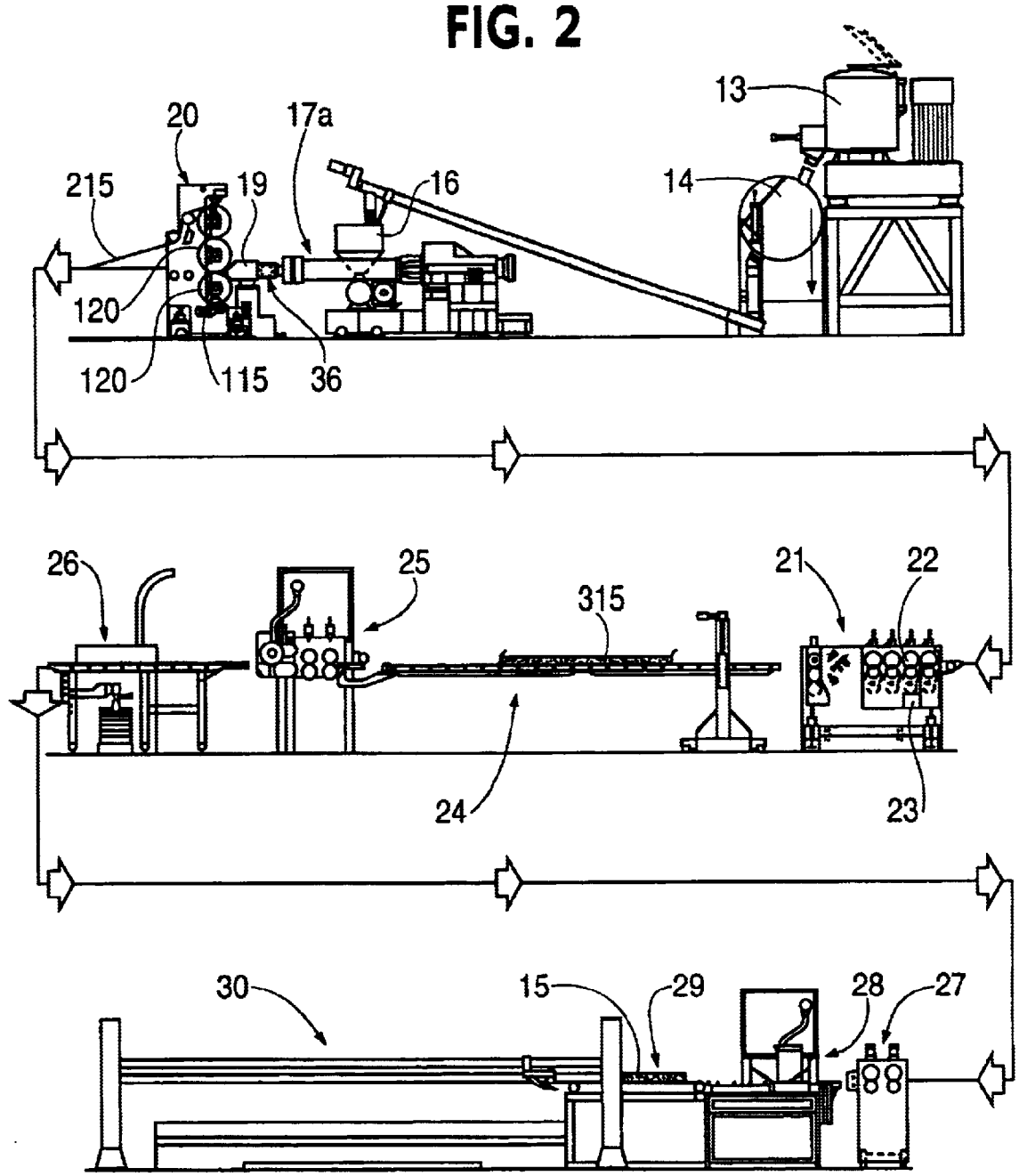

Subsequently, in order to eliminate the heat which has developed in the mixing device 13, the mixed raw materials 12a are cooled in a cooling device 14.

The raw materials 12a, having been mixed, homogenized and cooled, are fed to the hoppers 16 associated with the extruder 17a, in this case consisting of a two-stage co-extruder, from which the intermediate layer 18b is obtained.

The extruder 17a cooperates with two lateral extruders 17b and 17c, which are fed by the respective raw materials 12b and 12c, so as to obtain, respectively, the upper layer 18c and the lower layer 18a.

In this case, in cooperation with the extruder 17b, there is a de-humidifying device 35, and also a geared volumetric pump 38 and a filter assembly 37.

The extruders 17a, 17b and 17c converge on a feeding assembly 36 where the layers 18a, 18b and 18c are superimposed and plastified, giving rise to a flat multi-layer plate 115 which is then fed to an extrusion head 19 with flat lips.

The flat plate 115 thus produced is then fed to a calendering assembly 20, in this case composed of three superimposed cylinders 120, from which a flat plate 215 emerges.

The cylinders 120 of the calendering assembly 20 perform an action of high level surface finishing on the flat plate 115 which emerges as a flat plate 215 which is perfectly stabilized both thermally, chemically and dimensionally. The overall thickness, and also that of the individual layers 18, is uniform over the whole surface; this guarantees a perfect cohesion between the layers 18, and also the desired rigidity and consistency.

The flat plate 215 thus stabilized is then fed to a thermal adjustment and shaping assembly 21 comprising a plurality of shaping rollers 22 associated with heating means 23.

The heating means 23 take the flat plate 215 to, and/or maintain it at, a temperature which is suitable for shaping, so that the shaping rollers 22 can perform this operation easily.

In this case, the shaping rollers 22 impress a lengthwise wave shape on the plates 215 and the plates 315 emerging from the thermal adjustment and-shaping assembly 21 are of the type shown in FIGS. 4, 5 and 6.

According to a variant the shaping rollers 22 impress a transverse wave shape on the plates 215.

According to another variant, the shaping rollers 22 impress a fretted shape of the type shown in FIG. 7. Furthermore, other types of shapes, or a mixed type may be obtained, but are not shown here.

The shaped plate 315 is then cooled, naturally or forced, on a sliding surface 24 and fed, by a drawing unit 25, towards an assembly to trim the edges 26. This assembly is also suitable to recover the off-cuts.

The shaped plate 315 is then drawn by a second drawing unit 27 to an assembly for shearing to size 28, in this case a disk-type transverse cutter.

The shaped plates 15 thus obtained are transported, on a powered belt 29, towards a discharge device 30 which, in this case, stacks the plates 15, for example on pallets.

In the case shown in FIGS. 4, 5 and 7, the shaped multi-layered plates 15 consists of three layers 18, respectively the lower layer 18a, the intermediate layer 18b and the upper layer 18c.

In FIGS. 10 and 11 the multi-layer plates 15 are of the flat type and consist of two layers: the lower layer 18a and the intermediate layer 18b in FIG. 11, the upper layer 18c and the intermediate layer 18b in FIG. 10.

In one embodiment of the invention, the lower layer 18a and the upper layer 18c are between 0.15 and 0.25 mm. thick, and the intermediate layer 18b is between 1.5 and 4 mm. thick.

In the preferred embodiment of the invention, for shaped plates, with two, three or more layers, the lower layer 18a is made of anti-shock polyvinyl chloride (PVC).

According to a variant, the lower layer 18a is loaded with filling and/or strengthening material such as, for example, calcium carbonate ($CaCO_3$). According to another variant, the lower layer 18a is made of polycarbonate (PC) or of high density polyethylene (PEHD).

The intermediate layer 18b is made of polyvinyl chloride (PVC), plus a possible semi-expanded material, with the addition of filling materials, for example cork, wood chips, granules of cereal or other material, and/or loaded with strengthening materials such as, for example, calcium carbonate ($CaCO_3$), mineral ceramics or fibre glass.

According to a variant, the intermediate layer 18b is made of high density polyethylene (PEHD) or polypropylene (PP).

According to another variant, the intermediate layer 18b is loaded with strengthening and/or filling materials to a percentage of between 45 and 70% in weight.

In one embodiment of the invention, the upper layer 18c is made of polymethyl methacrylate (PMMA).

According to other embodiments, the upper layer 18c is made of polycarbonate (PC) or anti-shock polyvinyl chloride (PVC) or polypropylene (PP) or acrylonitrile-butadiene-styrene (ABS) or high density polyethylene (PEHD)

According to a further embodiment, the upper layer 18c is made of a melamine film associated with the intermediate layer 18b by cohesion; the melamine guarantees a high surface resistance.

In the variant shown in FIG. 6, a supplementary layer 18d of non-woven fabric is applied, by simple heat cohesion, to the lower layer 18a of the shaped plate 15.

In FIG. 8, the supplementary layer 18d of non-woven fabric 31 is connected with the lower layer 18a of the flat plate 115 emerging from the co-extrusion head 19 before the calendering step; the connection is performed upstream of the calendering assembly 20 by an application assembly 34 including at least two counter-opposed cylinders 32.

In the variant shown in FIG. 9, the connection is performed on the flat plate 215 emerging from the calendering assembly 20; the application assembly 134 comprises heating means 33 which heat the lower layer 18a to a suitable temperature for connection to the non-woven fabric 31.

According to a variant, the heating of at least the lower layer 18a is performed by the cylinders 32 which are equipped with their own heating means.

What is claimed is:

1. Method to produce shaped multi-layer plates, comprising super-imposed layers, the method comprising:
    individually extruding raw materials comprising powder, granules, or crystals, in liquid form, to form a plurality of separate layers, each layer being mono-component or multi-component,
    superimposing the separate layers,
    co-extruding the superimposed layers through a co-extrusion head with plane lips to form a continuous flat multi-layer plate with a plane surface,
    subjecting the flat multi-layer plate emerging from the co-extrusion head to a calendering pass to provide thermal, chemical and dimensional stabilization,
    subjecting the flat continuous multi-layer plate emerging from the calendering pass to a pass of thermal adjustment and shaping, and
    cooling and shearing to size the shaped multi-layer plate emerging from the pass of thermal adjustment and shaping so as to obtain shaped multi-layer plate of the desired length.

2. Method as in claim 1, further comprising heating the shaped multi-layer plate during the pass of thermal adjustment and shaping.

3. Method as in claim 1, further comprising, downstream of the co-extrusion head, connecting at least one supplementary layer for protection and adornment purposes to the continuous flat multi-layer plate by a process of heat cohesion.

4. Method as in claim 3, characterised in that the step of connecting the flat multi-layer plate and the supplementary layer is performed upstream of the calendering and stabilization pass.

5. Method as in claim 3, characterised in that the step of connecting the flat multi-layer plate and the supplementary layer is performed downstream of the calendering pass and upstream of the thermal adjustment and shaping pass.

6. Method as in claim 5, further comprising heating at least the connection surface of the multi-layer plate before the application of the supplementary layer.

7. Plant for the production of shaped multi-layer plates, comprising super-imposed layers made of thermoplastic resin obtained by a process of extrusion from ray materials in powder, in granules, in crystals, in liquid form, optionally with additives, each layer being able to be of the mono-component or multi-component type, the plant including at least a mixing and homogenization device, a cooling device, extrusion assemblies to obtain the layers, a feeding assembly and an extrusion head, the plant being characterised in that it comprises:
    a calendaring assembly arranged downstream of the co-extrusion head, having the function of thermal, chemical and dimensional stabilization of the layers of the multi-layer plate as it emerges flat from the co-extrusion head,
    a thermal adjustment and shaping assembly, arranged downstream of the calendaring assembly, comprising at least shaping rollers associated with heating means,
    an assembly for trimming the edges of the shaped multi-layer plate arranged downstream of the thermal adjustment and shaping assembly;
    an assembly for shearing to size the shaped multi-layer plate to obtain multi-layer plates of the desired length and
    an assembly to discharge and collect the shaped multi-layer plates which have been sheared to size.

8. Plant as in claim 7, characterised in that at least the extrusion assembly of the intermediate layer is a two stage co-extruder.

9. Plant as in claim 7, characterised in that it comprises an assembly to apply a supplementary layer of material for strengthening, finishing or adornment arranged downstream of the co-extrusion head.

10. Plant as in claim 9, characterised in that the application assembly is arranged upstream of the calendaring assembly.

11. Plant as in claim 9, characterised in that the application assembly is arranged between the calendaring assembly and the thermal adjustment and shaping assembly.

12. Plant as in claim 9 inclusive, characterised in that the application assembly comprises heating means cooperating at least with the connecting face of the multi-layer plate.

13. Shaped multi-layer plate, comprising at least two super-imposed layers extruded from raw materials in powder, in granules, in crystals, in liquid form, optionally with additives, each layer being able to be mono-component or multi-component, the plate being obtainable by the method claimed in claim 1 the shaped plate comprising at least an intermediate strengthening and stiffening layer connected with at least a lower and/or upper layer for covering and protection purposes, the shaped plate being characterised in that the intermediate layer is between 1.5 mm. and 4 mm. thick, and the lower layer or the upper layer are between 0.15 and 0.25 mm. thick.

14. Shaped multi-layer plate as in claim 13, characterised in that the intermediate layer is made of polyvinyl chloride charged with strengthening materials or lightened with semi-expanded materials.

15. Shaped multi-layer plate as in claim 13, characterised in that the intermediate layer is made of high density polyethylene.

16. Shaped multi-layer plate as in claim 13, characterised in that the intermediate layer is made of polypropylene.

17. Shaped multi-layer plate as in claim 13, characterised in that the intermediate layer is made of at least two layers of which at least one is made of semi-expanded material.

18. Shaped multi-layer plate as in claim 13, characterised in that the lower layer is made of polyvinyl chloride.

19. Shaped multi-layer plate as in claim 13, characterised in that the lower layer is made of polycarbonate.

20. Shaped multi-layer plate as in claim 13, characterised in that the lower layer is made of high density polyethylene.

21. Shaped multi-layer plate as in claim 13, characterised in the lower layer is made of polypropylene.

22. Shaped multi-layer plate as in claim 13, characterised in that the upper layer is made of polymethyl methacrylate.

23. Shaped multi-layer plate as in claim 13, characterised in that the upper layer is made of polycarbonate.

24. Shaped multi-layer plate as in claim 13, charactrerised in that the upper layer is made of polyvinyl Chloride.

25. Shaped multi-layer plate as in claim 13, characterised in that the upper layer is made of polypropylene.

26. Shaped multi-layer plate as in claim 13, characterised in that the upper layer is made of acrylonitrile-butadiene-styrene.

27. Shaped multi-layer plate as in claim 14, characterised in that the strengthening materials or the semi-expanding materials are one of calcium carbonate, cork powder, wood chips, cereal granules, mineral fibres or glass fibres.

28. Shaped multi-layer plate as in claim 13, characterised in that it includes a supplementary layer of material for strengthening, lining, adornment or other purposes.

29. Shaped multi-layer plate as in claim 28, in which the supplementary layer is made of non-woven fabric.

30. Shaped multi-layer plate as in claim 28, in which the supplementary layer is made of artificial leather.

31. Shaped as in claim 13, characterised in that it has an undulate shape lengthwise to the plate.

32. Shaped multi-layer plate as in claim 13, characterised in that it has an undulate shape transverse to the plate.

33. Shaped multi-layer plate as in claim 13, characterised in that it is fretted.

* * * * *